United States Patent
Nakai et al.

(10) Patent No.: US 9,480,956 B2
(45) Date of Patent: Nov. 1, 2016

(54) HYDROGEN SULFIDE GAS PRODUCTION PLANT AND METHOD FOR RECOVERING AND USING WASTE HYDROGEN SULFIDE GAS

(71) Applicant: SUMITOMO METAL MINING CO., LTD., Tokyo (JP)

(72) Inventors: Osamu Nakai, Tokyo (JP); Satoshi Matsubara, Tokyo (JP); Tomoyuki Hirose, Tokyo (JP); Masafumi Nakamura, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 47 days.

(21) Appl. No.: 14/371,474

(22) PCT Filed: Jan. 7, 2013

(86) PCT No.: PCT/JP2013/050046
§ 371 (c)(1),
(2) Date: Jul. 10, 2014

(87) PCT Pub. No.: WO2013/108645
PCT Pub. Date: Jul. 25, 2013

(65) Prior Publication Data
US 2015/0044126 A1 Feb. 12, 2015

(30) Foreign Application Priority Data
Jan. 17, 2012 (JP) .................. 2012-007471

(51) Int. Cl.
*B01J 7/00* (2006.01)
*C01B 17/16* (2006.01)

(52) U.S. Cl.
CPC ............... *B01J 7/00* (2013.01); *C01B 17/162* (2013.01); *C01B 17/168* (2013.01); *B01J 2219/00002* (2013.01)

(58) Field of Classification Search
None
See application file for complete search history.

(56) References Cited

U.S. PATENT DOCUMENTS 2,474,066 A * 6/1949 Preisman .............. C01B 17/162
423/564
2,695,836 A * 11/1954 Gilmore ............ B01D 53/1493
422/107

(Continued)

FOREIGN PATENT DOCUMENTS

JP   B1-44-001686   1/1969
JP   B1-46-005572   2/1971

(Continued)

OTHER PUBLICATIONS

Oct. 20, 2015 Extended European Search Report issued in European Patent Application No. 13738386.5.

(Continued)

*Primary Examiner* — Melvin C Mayes
*Assistant Examiner* — Sheng H Davis
(74) *Attorney, Agent, or Firm* — Oliff PLC

(57) ABSTRACT

An object is to provide a hydrogen sulfide gas production plant that can recover discharged waste hydrogen sulfide gas and efficiently supply the gas to a process plant where processing is conducted by using hydrogen sulfide gas, and also provide a method for recovering and using the waste hydrogen sulfide gas by the hydrogen sulfide gas production plant. In the present invention, the hydrogen sulfide gas production plant is provided with a pipe that recovers the waste hydrogen sulfide gas discharged from the hydrogen sulfide gas production plant and that has one end connected to the process plant where the hydrogen sulfide gas is used, and the discharged waste hydrogen sulfide gas is recovered and the recovered waste hydrogen sulfide gas is supplied to the process plant through the pipe.

5 Claims, 6 Drawing Sheets

(56) References Cited

U.S. PATENT DOCUMENTS

| | | | | |
|---|---|---|---|---|
| 2,876,071 | A | * | 3/1959 | Updegraff ............ C01B 17/162 422/198 |
| 3,168,375 | A | * | 2/1965 | Barut ................. C22B 23/0461 23/300 |
| 3,819,801 | A | * | 6/1974 | Bell ................... C22B 23/0407 423/138 |
| 3,860,696 | A | * | 1/1975 | McGauley ............... C22B 3/08 423/146 |
| 4,332,774 | A | * | 6/1982 | Drum .................... B01J 12/005 422/109 |
| 4,612,020 | A | | 9/1986 | Fischer et al. |
| 5,173,285 | A | | 12/1992 | Takenaka et al. |
| 5,686,056 | A | | 11/1997 | Kimtantas |
| 5,983,996 | A | * | 11/1999 | Romero ............... B01D 5/0018 165/111 |
| 2007/0012595 | A1 | * | 1/2007 | Brownscombe ....... C10G 45/00 208/14 |
| 2009/0053130 | A1 | * | 2/2009 | Redlingshoefer ........ B01J 19/02 423/564 |
| 2009/0317322 | A1 | | 12/2009 | Wölfert et al. |
| 2013/0199620 | A1 | | 8/2013 | Mitsui et al. |

FOREIGN PATENT DOCUMENTS

| | | | |
|---|---|---|---|
| JP | A-01-257109 | | 10/1989 |
| JP | A-02-055210 | | 2/1990 |
| JP | A-09-286861 | | 11/1997 |
| JP | 2004305917 | * | 11/2004 |
| JP | A-2009-517548 | | 4/2009 |
| JP | A-2010-515658 | | 5/2010 |
| JP | A-2010-126778 | | 6/2010 |
| WO | WO 2007/074360 A2 | | 7/2007 |
| WO | 2011/132693 A1 | | 10/2011 |
| WO | 2011129395 | * | 10/2011 |

OTHER PUBLICATIONS

Apr. 2, 2013 International Search Report issued in International Application No. PCT/JP2013/050046 (with translation).

* cited by examiner

HYDROGEN SULFIDE GAS PRODUCTION PLANT AND METHOD FOR RECOVERING AND USING WASTE HYDROGEN SULFIDE GAS

TECHNICAL FIELD

The present invention relates to a hydrogen sulfide gas production plant and a method for recovering and using waste hydrogen sulfide gas, and more specifically to a hydrogen sulfide gas production plant, which is capable of recovering discharged waste hydrogen sulfide gas and supplying the hydrogen sulfide gas to a process plant where hydrogen sulfide gas is used, and a method for recovering and using the waste hydrogen sulfide gas by that hydrogen sulfide gas production plant.

This application claims priority from PCT/2013/050046, filed on Jan. 7, 2013 which claims priority to Japanese Patent Application No. 2012-7471 filed with the Japan Patent Office on Jan. 17, 2012, the entire content of which is hereby incorporated by reference.

BACKGROUND ART

For example, hydrometallurgy for nickel oxide ore includes a sulfuration process for forming a metal sulfide by injecting hydrogen sulfide gas to a solution obtained by neutralizing a leach liquor of nickel oxide ore or a nickel recovery solution from which impurities have been removed.

The hydrogen sulfide gas used here is produced by, for example, a hydrogen sulfide gas production plant having a structure as depicted in FIG. 5 or FIG. 6.

Specifically, a hydrogen sulfide gas production plant 50 depicted in FIG. 5 includes a reaction facility 51 for generating hydrogen sulfide gas from supplied sulfur and hydrogen gas, a cooling facility 52 for cooling the hydrogen sulfide gas, a washing facility 53 for washing the sulfur included in the hydrogen sulfide gas, and a drying facility 54 for drying the washed hydrogen sulfide gas to remove the moisture. The hydrogen sulfide gas production plant 50 further includes, as incidental facilities, a storing facility 55 for storing the generated hydrogen sulfide gas and a supplying facility 56 for supplying the hydrogen sulfide gas.

The hydrogen sulfide gas production plant 50 uses the catalyst in the reactor 51 for the purpose of reducing the activation energy. In the hydrogen sulfide gas production plant 50, after the sulfur included in the produced hydrogen sulfide gas is removed in the washing facility 53, the moisture is removed in the drying facility 54, whereby the corrosion of the facility due to the moisture is prevented.

In the hydrogen sulfide gas production plant 50, the pressure of the produced hydrogen sulfide gas is increased up to the necessary pressure by using the supplying facility 56 such as a compressor, and the hydrogen sulfide gas with the increased pressure is supplied to the plant where the hydrogen sulfide gas is used in the process of dezincification or sulfuration in the aforementioned hydrometallurgy for nickel oxide ore.

As for the condition of the hydrogen sulfide gas production plant 50 for producing the hydrogen sulfide gas, for example, the pressure is set to approximately 5 kPaG and the temperature is approximately 380° C. The operation is possible at low pressure and low temperature, which is advantageous because the catalyst is used in the reaction facility 51 in the hydrogen sulfide gas production plant 50.

In the hydrogen sulfide gas production plant 50, however, however, it is necessary to regularly exchange the catalyst in the reaction facility 51 and moreover to strictly manage the quality of the sulfur, which is the raw material of the hydrogen sulfide gas, from the viewpoint of the lifetime of the catalyst.

On the other hand, a hydrogen sulfide gas production plant 60 depicted in FIG. 6 is a plant where the catalyst is not used in the reactor. The hydrogen sulfide gas production plant 60 includes, as depicted in FIG. 6, a reaction facility (reactor 66, a quench tower 67, and a heater 68) 61 for generating the hydrogen sulfide gas from sulfur and hydrogen gas, cooling facilities 62 (62A, 62B) for cooling the hydrogen sulfide gas, a knockout facility 63 for removing the sulfur out of the hydrogen sulfide gas and supplying the hydrogen sulfide gas, and a blow-down facility 64 for recovering the sulfur removed from the hydrogen sulfide gas and supplying the sulfur to a sulfur processing plant or the like. In addition, the hydrogen sulfide gas production plant 60 includes, as an incidental facility, a facility 65 for decreasing the temperature of the sulfur in order to adjust the thermal balance.

In the hydrogen sulfide gas production plant 60, the molten sulfur is stored in the reactor 66 of the reaction facility 61 and by supplying the hydrogen gas from below, the reaction of the hydrogen sulfide gas progresses while the hydrogen gas passes through the molten sulfur. The decrease in sulfur by the reaction is compensated from above the reaction facility 61. The hydrogen sulfide gas generated in the reaction facility 61 is mostly hydrogen sulfide but also includes sulfur steam mixed when the hydrogen gas passes through the reactor.

Moreover, as for the condition of producing the hydrogen sulfide gas in the hydrogen sulfide gas production plant 60, for example, the pressure is as high as 800 kPaG and the temperature is as high as 470° C. The temperature of the generated hydrogen sulfide gas is as low as 150° C. when the gas exits from the quench tower 67 included in the reaction facility 61; moreover, the temperature thereof is decreased to approximately 50° C. (temperature used in the facility to which the gas is supplied) in the cooling facility 62 and then the gas is transferred to the knockout facility 63.

A large part of sulfur included in the hydrogen sulfide gas generated in the reaction facility 61 causes a trouble if firmly fixed to a measurement tool such as a thermometer or a pressure gauge or a valve such as a manual valve or a control valve of a plant in which the hydrogen sulfide gas is used and to which the sulfur is supplied. Therefore, the sulfur is solidified once in the knockout facility 63 and the sulfur deposited at the bottom is heated to be molten with steam through a jacket installed at the outer periphery of the bottom of the knockout facility 63 and thus the sulfur is recovered. The recovered sulfur is stored in the blow-down facility 64 and then supplied to the sulfur processing plant by using a supply pump 69 and processed therein or iteratively used therein.

In this manner, the sulfur included in the hydrogen sulfide gas generated in the hydrogen sulfide gas production plant 60 is separated in a knockout drum and the hydrogen sulfide gas is supplied to a plant where the hydrogen sulfide gas is used in the process of dezincification or sulfuration in the aforementioned hydrometallurgy for nickel oxide ore.

In the hydrogen sulfide gas production plant 60, the operation is managed with the pressure in the system set high; therefore, the facility such as the compressor or the chiller facility is not necessary to thereby suppress the initial investment. Moreover, the regular exchange of the catalyst and the cost required for the exchange, and the maintenance cost including the quality control of the sulfur, which are necessary in the hydrogen sulfide gas production plant 50 as described above, are not necessary, which is advantageous in terms of the operation cost.

In the hydrogen sulfide gas production plant 60, however, the operation is conducted at high pressure and high temperature; therefore, when the produced hydrogen sulfide gas is supplied, it is necessary to reduce the pressure to the appropriate pressure in the operation of the plant to which the gas is supplied. For example, in the plant in the sulfuration process for generating the mix sulfide (mix sulfide: MS) including nickel and cobalt by processing nickel oxide ore, the pressure of the hydrogen sulfide gas is set to approximately 350 kPaG; in the plant in the dezincification process for producing the zinc sulfide from zinc included in the neutralizing finish solution by performing the sulfuration, the pressure of the hydrogen sulfide gas is set to approximately 5 kPaG or less. In addition, the operation of the hydrogen sulfide gas production plant 60 is conducted at high pressure and high temperature; therefore, the risk in the occurrence of gas leak is high and the hydrogen sulfide gas cooling facility 62 as the facility for cooling the sulfur (sulfur steam) included in the hydrogen sulfide gas and the knockout facility 63 as the facility for recovering the hydrogen sulfide gas are heavily burdened.

In the hydrogen sulfide gas production plant 60, the sulfur included in the generated hydrogen sulfide gas is removed in the knockout facility 63 but part of the sulfur is solidified in the cooling facility 62 and fixed to the inside; if the solidified sulfur is left fixed thereto, the operation efficiency is deteriorated. Therefore, a plurality of cooling facilities is prepared and used alternately. Specifically, for example, two cooling facilities 62A and 62B are prepared and as the cooling performance is deteriorated by the sulfur fixed to the inside, the cooling facility 62A in use (facility with the sulfur fixed therein) is replaced by the standby cooling facility 62B (with the sulfur removed therefrom). Then, the sulfur fixed to the inside of the cooling facility 62A whose cooling performance has deteriorated is recovered by being molten with steam to make the cooling facility 62A standby. By repeating this operation, the deterioration in rate of operation of the hydrogen sulfide gas production plant 60 is prevented. The sulfur molten and recovered by the cooling facilities 62 (62A and 62B) is transferred to the blow-down facility 64 and processed therein similarly.

Incidentally, in the hydrogen sulfide gas production plant 60, the cooling facility 62 (for example, cooling facility 62A) switched for the process of melting the fixed sulfur is the facility that has been used to cool the hydrogen sulfide gas till just a while ago. Therefore, the high-pressure and high-concentration hydrogen sulfide gas is left in the cooling facility 62A. For this reason, before the sulfur fixed to the inner wall of the cooling facility 62A is melted and recovered, the pressure in the cooling facility 62A needs to be released.

The hydrogen sulfide gas generated when the pressure is released, however, becomes so-called waste hydrogen sulfide gas and is wasted. Moreover, this waste hydrogen sulfide gas is very toxic and it is not allowed to release the gas in the air as it is. Therefore, it is necessary to discharge the gas after processing the gas in a flare facility (facility for decreasing the toxicity by burning the toxic gas) or a detoxifying facility in which caustic soda or the like is used.

In the ease of processing the waste hydrogen sulfide gas in the flare facility, however, the hydrogen sulfide gas becomes SOx gas and adversely affects the environment though slightly. In the case of detoxifying the gas in the detoxifying facility, on the other hand, the neutralizer such as caustic soda is necessary and the cost of the neutralizer is added.

Patent Literature 1 discloses a method for recovering extra hydrogen sulfide gas discharged from a sulfur reactor in the sulfuration process of producing MS by processing nickel oxide ore, wherein the extra hydrogen sulfide gas is reused in the sulfuration reaction through a liquid obtained by having the caustic soda absorb the hydrogen sulfide gas (the liquid is in the form of hydrosulfide soda or sulfide soda). Moreover, Patent Literature 2 discloses a method for recovering the hydrogen sulfide gas vaporized in the dehydration process by absorbing the gas in an organic amide solvent outside the system of the dehydration process and reusing the recovered hydrogen sulfide in the polymerization reaction as a raw material of the alkali metal sulfide.

These methods, however, do not allow the hydrogen sulfide to be recovered as gas and require the recovery solvent such as the caustic soda or the organic amide.

CITATION LIST

Patent Literature

Patent Literature 1: JP 2010-126778 A
Patent Literature 2: JP H09-286861 A

SUMMARY OF INVENTION

Technical Problem

The present invention has been made in view of the above circumstances, and provides a hydrogen sulfide gas production plant capable of recovering the discharged waste hydrogen sulfide gas and efficiently supplying the hydrogen sulfide gas to a process plant where processing is conducted by using the hydrogen sulfide gas, and also provides a method for recovering and using the waste hydrogen sulfide gas by the hydrogen sulfide gas production plant.

Solution to Problem

As a result of concerted studies for achieving the above object, the present inventors have found that the discharged waste hydrogen sulfide gas can be efficiently recovered and effectively supplied to the process plant where processing is performed by using the hydrogen sulfide gas when the hydrogen sulfide gas production plant is provided with a pipe that recovers the waste hydrogen sulfide gas discharged from the plant and has one end connected to the process plant where the hydrogen sulfide gas is used.

Namely, a hydrogen sulfide gas production plant according to the present invention includes, at least: a reaction facility that generates hydrogen sulfide gas from sulfur and hydrogen gas; a plurality of cooling facilities that cools the generated hydrogen sulfide gas; and a sulfur removing facility that removes the sulfur included in the hydrogen sulfide gas, the hydrogen sulfide gas production plant further including a pipe that recovers waste hydrogen sulfide gas generated in the cooling facility and discharged from the hydrogen sulfide gas production plant and that has one end connected to a process plant where hydrogen sulfide gas is used, to supply the recovered waste hydrogen sulfide gas to the process plant.

Moreover, a method for recovering and using waste hydrogen sulfide gas according to the present invention is a method for recovering and using waste hydrogen sulfide gas generated in a hydrogen sulfide gas production plant including at least a reaction facility that generates hydrogen sulfide gas from sulfur and hydrogen gas, a plurality of cooling facilities that cools the generated hydrogen sulfide gas, and a sulfur removing facility that removes sulfur included in the hydrogen sulfide gas, wherein the hydrogen sulfide gas production plant is provided with a pipe that recovers the waste hydrogen sulfide gas discharged from the hydrogen sulfide gas production plant and has one end connected to a process plant where hydrogen sulfide gas is used, and the discharged waste hydrogen sulfide gas is recovered and the waste hydrogen sulfide gas is supplied to the process plant through the pipe.

Advantageous Effects of Invention

According to the present invention, the discharged waste hydrogen sulfide gas is efficiently recovered and effectively supplied to the process plant where processing is performed by using the hydrogen sulfide gas, without the use of the flare facility or the detoxifying facility.

DESCRIPTION OF EMBODIMENTS

Figure 1:
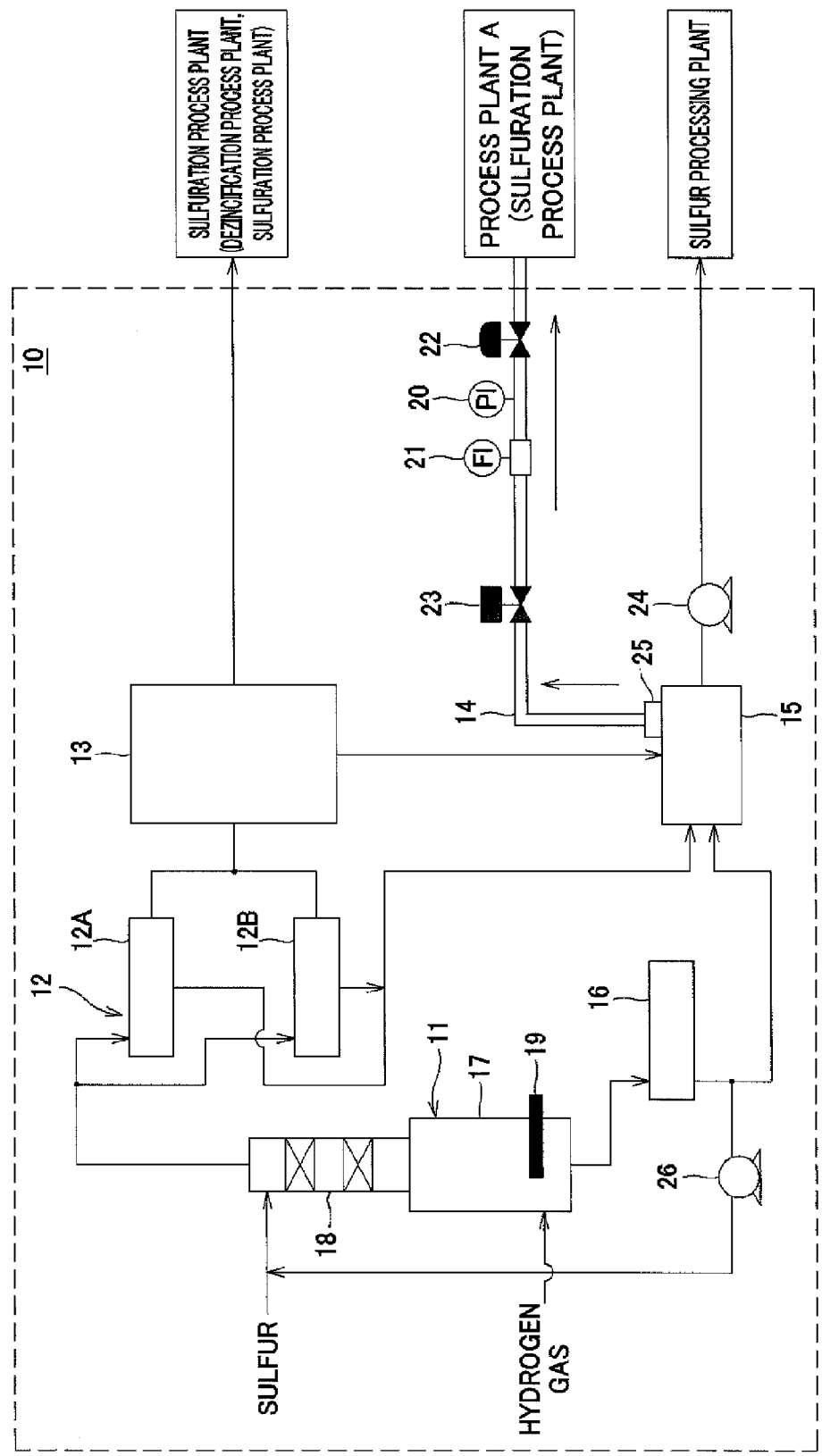
FIG. 1 is a schematic structure diagram depicting an example of a structure of a hydrogen sulfide gas production plant.

Description is hereinafter made of a hydrogen sulfide gas production plant and a method for recovering and using the waste hydrogen sulfide gas according to the present invention in the following order. The present invention is not limited to the embodiments below and various changes can be made without departing from the scope of the present invention.

1. Summary of the present invention
2. Hydrogen sulfide gas production plant
 2-1. First embodiment
 2-2. Second embodiment
3. Method for recovering and using waste hydrogen sulfide gas
 3-1. First embodiment
 3-2. Second embodiment
4. Examples

1. SUMMARY OF THE PRESENT INVENTION

A hydrogen sulfide gas production plant according to the present invention is a hydrogen sulfide gas production plant including at least a reaction facility that generates hydrogen sulfide gas from sulfur and hydrogen gas, a plurality of cooling facilities that cools the generated hydrogen sulfide gas, and a sulfur removing facility that removes sulfur included in the hydrogen sulfide gas, wherein the hydrogen sulfide gas production plant is provided with a pipe that recovers the waste hydrogen sulfide gas discharged from the hydrogen sulfide gas production plant and has one end connected to a process plant where hydrogen sulfide gas is used. In the present invention, the waste hydrogen sulfide gas recovered and supplied to the process plant through the pipe.

When the hydrogen sulfide gas generated in the reaction facility is cooled in the cooling facility in the hydrogen sulfide gas production plant, part of the sulfur included in the hydrogen sulfide gas is solidified and fixed to the bottom of the cooling facility. In order to prevent the deterioration in cooling performance and the deterioration in operation efficiency caused thereby, a plurality of cooling facilities is prepared and used alternately; the cooling facility that has been replaced and stopped temporarily is subjected to the process of removing the remaining sulfur. When the sulfur is removed here, the waste hydrogen sulfide gas is generated.

The waste hydrogen sulfide gas generated from the plant has been unused mostly and wasted in the hydrogen sulfide gas production. Moreover, since the gas cannot be released into the air as it is, the gas has been processed by using the flare facility or the detoxifying facility. However, the environment has been burdened not a little, and the neutralizer such as caustic soda has been additionally necessary.

In contrast to this, in the hydrogen sulfide gas production plant and the method for recovering and using the waste hydrogen sulfide gas by using the plant according to the present invention, the discharged waste hydrogen sulfide gas can be efficiently recovered and supplied to the process plant where the hydrogen sulfide gas is used and can be therefore effectively used. Moreover, since the conventional process using the flare facility or the detoxifying facility is not necessary, the burden on the environment can be effectively reduced and the neutralizer such as caustic soda is not necessary; thus, the present invention is advantageous also in terms of cost.

The process plant where the hydrogen sulfide gas is used corresponds to, for example, a dezincification process plant used in the dezincification process or a sulfuration process plant used in the sulfuration process in the hydrometallurgy for nickel oxide ore.

The hydrometallurgy for nickel oxide ore is a hydrometallurgy for recovering nickel and cobalt from slurry of nickel oxide ore using, for example, a high-pressure acid leach method (HPAL method). Specifically, the hydrometallurgy for nickel oxide ore includes: a leach step of adding sulfate to slurry of nickel oxide ore and leaching the mixture under high temperature and high pressure; a solid-liquid separation step of washing the leach slurry in multiple stages and separating a residue, thereby providing a leach liquor including an impurity element together with nickel and cobalt; a neutralization step of separating a neutralized sediment including the impurity element by adjusting the pH of the leach liquor, thereby providing a neutralizing finish solution including zinc together with nickel and cobalt; a dezincification step of forming and separating zinc sulfide by injecting hydrogen sulfide gas to the neutralizing finish solution, thereby providing a nickel recovery mother liquor including nickel and cobalt; and a sulfuration step of injecting the hydrogen sulfide gas to the nickel recovery mother liquor, thereby providing a mix sulfide including nickel and cobalt.

In the dezincification step and the sulfuration step in the hydrometallurgy for the nickel oxide ore, the hydrogen sulfide gas is injected to the gas phase of the reactor in each plant to produce the sulfuration reaction, thereby forming a metal sulfide. Therefore, the hydrogen sulfide gas produced properly from the hydrogen sulfide gas production plant and moreover the hydrogen sulfide gas that has conventionally been dumped as the waste are recovered and supplied to the process plant where the hydrogen sulfide gas is used, whereby the hydrogen sulfide gas produced in the hydrogen sulfide gas production plant can be supplied without waste. In the process plant where the hydrogen sulfide gas is used, the cost of using the hydrogen sulfide gas can be reduced to enable the efficient hydrometallurgy operation.

Figure 6:
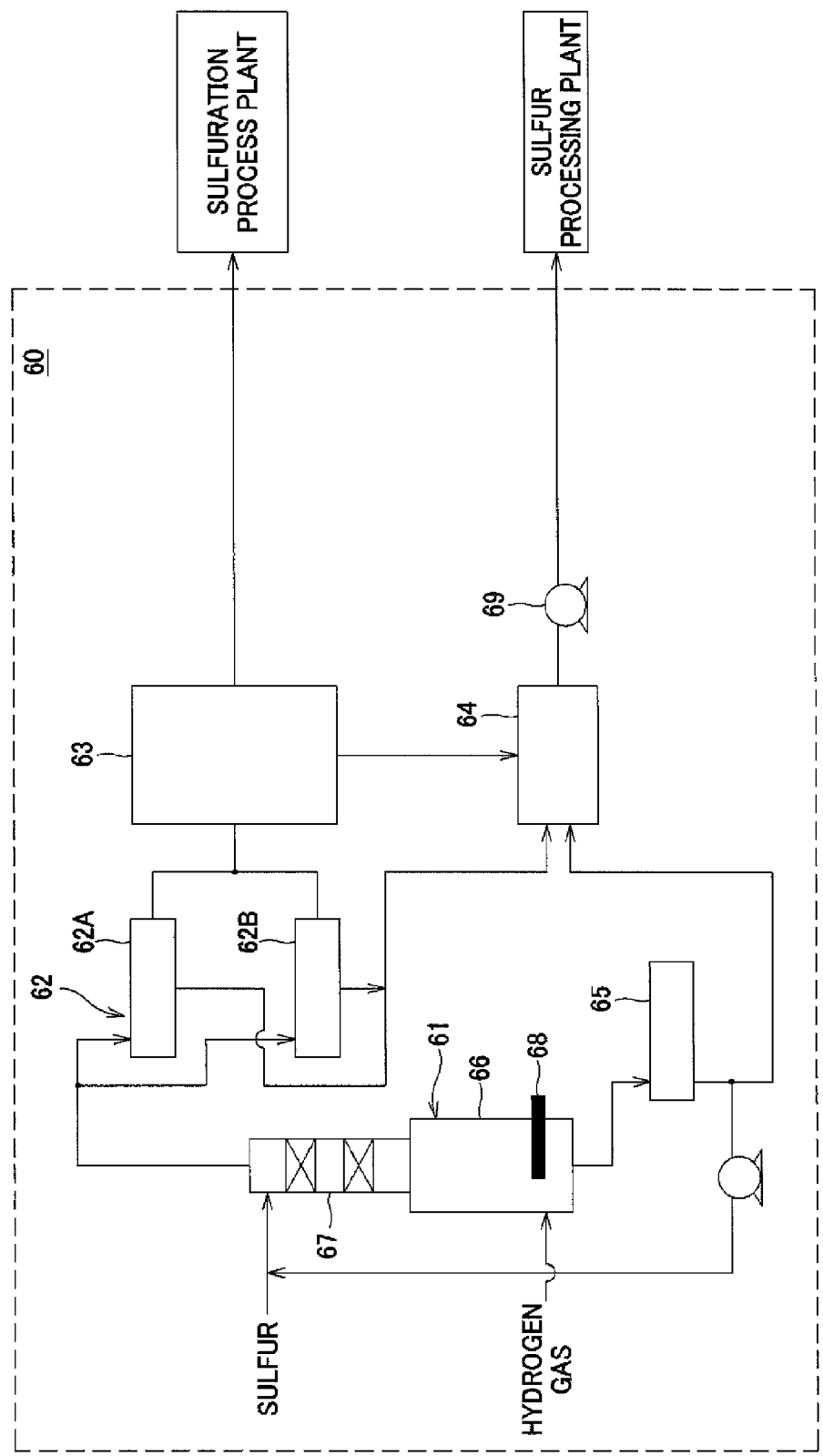
FIG. 6 is a schematic structure diagram depicting a structure of a conventional hydrogen sulfide gas production plant.

More specific description is hereinafter made of the embodiments related to the hydrogen sulfide gas production plant and the method for recovering and using the waste hydrogen sulfide gas according to the present invention with reference to the drawings. Note that the hydrogen sulfide gas production plant according to this embodiment is the plant obtained by improving the aforementioned hydrogen sulfide gas production plant 60 illustrated in FIG. 6 and the description to the common portion is omitted.

2. HYDROGEN SULFIDE GAS PRODUCTION PLANT

2-1. First Embodiment

FIG. 1 is a schematic diagram illustrating an example of a structure of a hydrogen sulfide gas production plant. A hydrogen sulfide gas production plant 10 depicted in FIG. 1 includes a reaction facility 11 for generating hydrogen sulfide gas, a plurality of cooling facilities 12 for cooling the generated hydrogen sulfide gas, and a sulfur removing facility 13 for removing the sulfur in the hydrogen sulfide gas and supplying the hydrogen sulfide gas from which the sulfur has been removed. The hydrogen sulfide gas production plant 10 includes a pipe 14 which recovers the waste hydrogen sulfide gas generated in the cooling facility 12 and discharged from the plant 10 and which has one end connected to a process plant A where the hydrogen sulfide is used.

The hydrogen sulfide gas production plant 10 further includes a blow-down facility 15 for recovering and storing the sulfur removed in the sulfur removing facility 13 and supplying the sulfur to a facility for processing the sulfur, and a sulfur cooling facility 16 for cooling the sulfur in order to adjust the thermal balance in the reaction facility 11.

The reaction facility 11 includes, for example, a reactor 17, a quench tower 18, and a heater 19. The reaction facility 11 produces the hydrogen sulfide gas generation reaction from the supplied sulfur and hydrogen gas, thereby generating the hydrogen sulfide gas. More specifically, a molten sulfur is stored in the reactor 17 and by the supply of the hydrogen gas from below, the reaction proceeds while the upward flow of the hydrogen gas passes through the molten sulfur, thereby producing the hydrogen sulfide gas. A large part of the hydrogen sulfide gas generated here is hydrogen sulfide, and includes also sulfur steam mixed when the hydrogen gas passes through the reactor 17.

The condition of the reaction facility 11 is that the temperature is as high as 470° C. and the pressure is as high as 800 kPaG, and the generated hydrogen sulfide also has high temperature and high pressure. As a result of exchanging the heat with the supplied sulfur, the hydrogen sulfide gas generated in the reaction facility 11 has a temperature of approximately 150° C. when passing through the quench tower 18.

The cooling facility 12 recovers the hydrogen sulfide gas generated in the reaction facility 11. The cooling temperature of the hydrogen sulfide gas in the cooling facility 12 is not particularly limited, and is preferably lower for reducing the sulfur in the hydrogen sulfide gas. Specifically, since (cooling) water is generally used, the gas is cooled down to approximately 50° C.

The hydrogen sulfide gas production plant 10 includes the plurality of cooling facilities 12. In the cooling facilities 12, part of sulfur included in the recovered hydrogen sulfide gas is solidified in the facility (heat conduction surface) and fixed thereto. Therefore, the plurality of cooling facilities 12 is provided and used alternately, whereby the deterioration in operation efficiency caused by the deterioration in cooling performance is prevented. Note that FIG. 1 illustrates an example where the hydrogen sulfide gas production plant 10 includes two cooling facilities 12A and 12B.

The cooling facilities 12A and 12B are provided with the jacket around their bottom portions, and are therefore able to melt the sulfur fixed thereto by heating the sulfur with steam. In the cooling facilities 12A and 12B, if the sulfur is fixed to the inside of the cooling facility 12A, for example, the cooling facility 12A is stopped and replaced by the cooling facility 12B. In the stopped cooling facility 12A, the sulfur fixed is melted by the steam and recovered.

Here, since the hydrogen sulfide gas has been cooled till just a while before in the cooling facility 12A or 12B that is stopped temporarily, the facility holds the hydrogen sulfide gas with high pressure and high concentration. Therefore, before the process of melting and recovering the sulfur fixed to the inside, it is necessary to discharge the hydrogen sulfide gas in the cooling facility 12A or 12B where the sulfur is to be melted and removed to reduce the internal pressure. In the hydrogen sulfide gas production plant 10, the hydrogen sulfide gas discharged at this time becomes the so-called waste hydrogen sulfide gas and is generated in the cooling facilities 12A and 12B.

In the mode of discharging the waste hydrogen sulfide gas from the hydrogen sulfide gas production plant 10, for example, the sulfur melted and recovered from the cooling facilities 12A and 12B and moreover the waste hydrogen sulfide gas are discharged to the blow-down facility 15, which is described below, to release the pressure; then, the gas is discharged from an outlet 25 provided at the blow-down facility 15. Alternatively, the waste hydrogen sulfide gas generated in the cooling facilities 12A and 12B may be discharged directly from the outlets provided at the cooling facilities 12A and 12B.

In the case of discharging the waste hydrogen sulfide gas from the outlet 25 provided at the blow-down facility 15, as depicted in FIG. 1, the pipe 14 to be described below is provided to connect the outlet 25 of the blow-down facility 15 and the process plant A where the hydrogen sulfide gas is used. In the case of directly discharging the waste hydrogen sulfide gas from the outlets provided at the cooling facilities 12A and 12B, the pipe 14 to be described below is provided to connect the outlets of the cooling facilities 12A and 12B and the process plant A where the hydrogen sulfide gas is used.

The sulfur removing facility (knockout facility) 13 removes the sulfur from the hydrogen sulfide gas cooled in the cooling facilities 12A and 12B. The sulfur removing facility 13 supplies the hydrogen sulfide gas from which the sulfur has been removed to the process plant or the like where the hydrogen sulfide gas is used. As aforementioned, the hydrogen sulfide gas generated in the reaction facility 11 partly includes the steam of sulfur. In the sulfur removing facility 13, the steam of the sulfur is solidified and deposited at the bottom, and the sulfur is melted by the steam through the jacket provided at the outer periphery of the bottom of the facility; thus, the sulfur is recovered. The recovered sulfur is transferred to the blow-down facility 15 to be described below.

The process plant to which the sulfur removing facility 13 supplies the hydrogen sulfide gas may be either the same as or different from the process plant A to which the waste hydrogen sulfide gas is supplied through the pipe 14. For example, the process plant corresponds to a sulfuration process plant or a dezincification process plant used in the hydrometallurgy for nickel oxide ore.

The pipe 14 recovers the waste hydrogen sulfide gas discharged from the hydrogen sulfide gas production plant 10 and has one end connected to the process plant A where the hydrogen sulfide gas is used. The waste hydrogen sulfide gas recovered by the pipe 14 is the hydrogen sulfide gas discharged in the process of melting and recovering the sulfur fixed in the cooling facilities 12A and 12B as described above. Note that this waste hydrogen sulfide gas is also the high-pressure gas of approximately 780 kPaG.

For example, the pipe 14 connects the outlet 25 of the blow-down facility 15 and the process plant A where the hydrogen sulfide gas is used as depicted in FIG. 1. The pipe 14 recovers the waste hydrogen sulfide gas generated in the cooling facilities 12A and 12B and released to the blow-down facility 15 through the outlet 25 of the blow-down facility 15 for performing the process of melting and recovering the sulfur. The recovered waste hydrogen sulfide gas is supplied through the pipe 14 to the process plant A to which one end of the pipe 14 is connected and in which the hydrogen sulfide gas is used.

The pipe 14 is provided with a pressure gauge 20 for measuring the pressure of the waste hydrogen sulfide gas supplied to the process plant A where the hydrogen sulfide gas is used, and a flowmeter 21 for measuring the flow rate of the waste hydrogen sulfide gas. The pipe 14 is provided with a control valve 22 for controlling the supply of the recovered waste hydrogen sulfide gas to the process plant A. Thus, the provision of at least the pressure gauge 20 and the control valve 22 and the control of the control valve 22 according to the pressure of the waste hydrogen sulfide gas measured with the pressure gauge 20 allow the pipe 14 to supply the waste hydrogen sulfide gas as appropriate to the process plant A. More specific description will be made below.

Moreover, the pipe 14 is provided with at least one ON/OFF valve 23, and allows the isolation of the waste hydrogen sulfide gas in an emergency between the hydrogen sulfide gas production plant 10 and the plant where the hydrogen sulfide gas is used.

The process plant A to which the waste hydrogen sulfide gas is supplied through the pipe 14 is not particularly limited as long as the plant A is a process plant where the hydrogen sulfide gas is used. For example, the sulfuration process plant or the dezincification process plant used in the hydrometallurgy for nickel oxide ore is used. The pressure of the hydrogen sulfide gas used in the process plant A is preferably lower than the operation pressure condition (780 to 800 kPaG) in the reaction facility 11 of the plant 10 because the waste hydrogen sulfide gas can be supplied smoothly without providing a transfer pump or the like due to the pressure difference.

The blow-down facility 15 recovers the sulfur removed from the hydrogen sulfide gas in the sulfur removing facility 13. The blow-down facility 15 moreover recovers the sulfur fixed inside the cooling facilities 12A and 12B. Then, the blow-down facility 15 supplies the recovered sulfur to a sulfur processing plant or the like by using a supply pump 24. The recovered sulfur may be circulated and used as the sulfur source supplied to the reaction facility 11 again.

The blow-down facility 15 is provided with the outlet 25 for discharging the waste hydrogen sulfide gas, which has been generated in the cooling facilities 12A and 12B and released to the blow-down facility 15, to the outside. The blow-down facility 15 has, as depicted in FIG. 1, the outlet 25 connected to the pipe 14 with which the facility 15 is connected to the process plant A where the hydrogen sulfide gas is used. Thus, the waste hydrogen sulfide gas discharged from the outlet 25 is recovered and supplied to the process plant A through the pipe 14.

The sulfur cooling facility 16 cools the sulfur for adjusting the thermal balance in the reaction facility 11 from approximately 470° C. to 150° C. The sulfur cooling facility 16 supplies the cooled sulfur to the blow-down facility 15, for example, and supplies the cooled sulfur and the sulfur recovered from the cooling facilities 12A and 12B and the sulfur removing facility 13 together to the sulfur processing plant or the like. The sulfur cooling facility 16 may recycle the cooled sulfur as the sulfur source to be supplied to the reaction facility 11 again through a circulation pump 26.

As described above, the hydrogen sulfide gas production plant 10 includes the pipe 14 which recovers the waste hydrogen sulfide gas generated from the cooling facilities 12A and 12B and discharged from the plant 10 and which has one end connected the process plant A where the hydrogen sulfide gas is used. Since this pipe 14 can supply the waste hydrogen sulfide gas discharged from the plant 10 to the process plant A, it is possible to efficiently recover the waste hydrogen sulfide gas, which has been wasted after being discharged, and to effectively use the gas in the process plant A. Moreover, the conventional processes in the flare facility and the detoxifying facility are not necessary; therefore, the cost of using the recovery solvent such as the caustic soda can be omitted to reduce the operation cost drastically.

The pipe 14 includes, at appropriate positions, at least the pressure gauge 20 for measuring the pressure of the waste hydrogen sulfide gas and the control valve 22 for controlling the supply of the waste hydrogen sulfide gas to the process plant A. Therefore, the recovered waste hydrogen sulfide gas can be supplied efficiently to the process plant A according to the measured pressure. Additionally, as depicted in FIG. 1, the pipe 14 is provided with the flowmeter 21 for measuring the flow rate of the waste hydrogen sulfide gas; therefore, the waste hydrogen sulfide gas can be supplied efficiently to the process plant A according to the flow rate of the waste hydrogen sulfide gas.

2-2. Second Embodiment

Although the example has been described in which one end of the pipe 14 is connected to one process plant A so that the waste hydrogen sulfide gas can be supplied to the one process plant A through the pipe 14 in the hydrogen sulfide gas production plant 10 depicted in FIG. 1, the present invention is not limited thereto and the pipe 14 may be provided so that the waste hydrogen sulfide gas can be supplied to a plurality of process plants.

Figure 2:
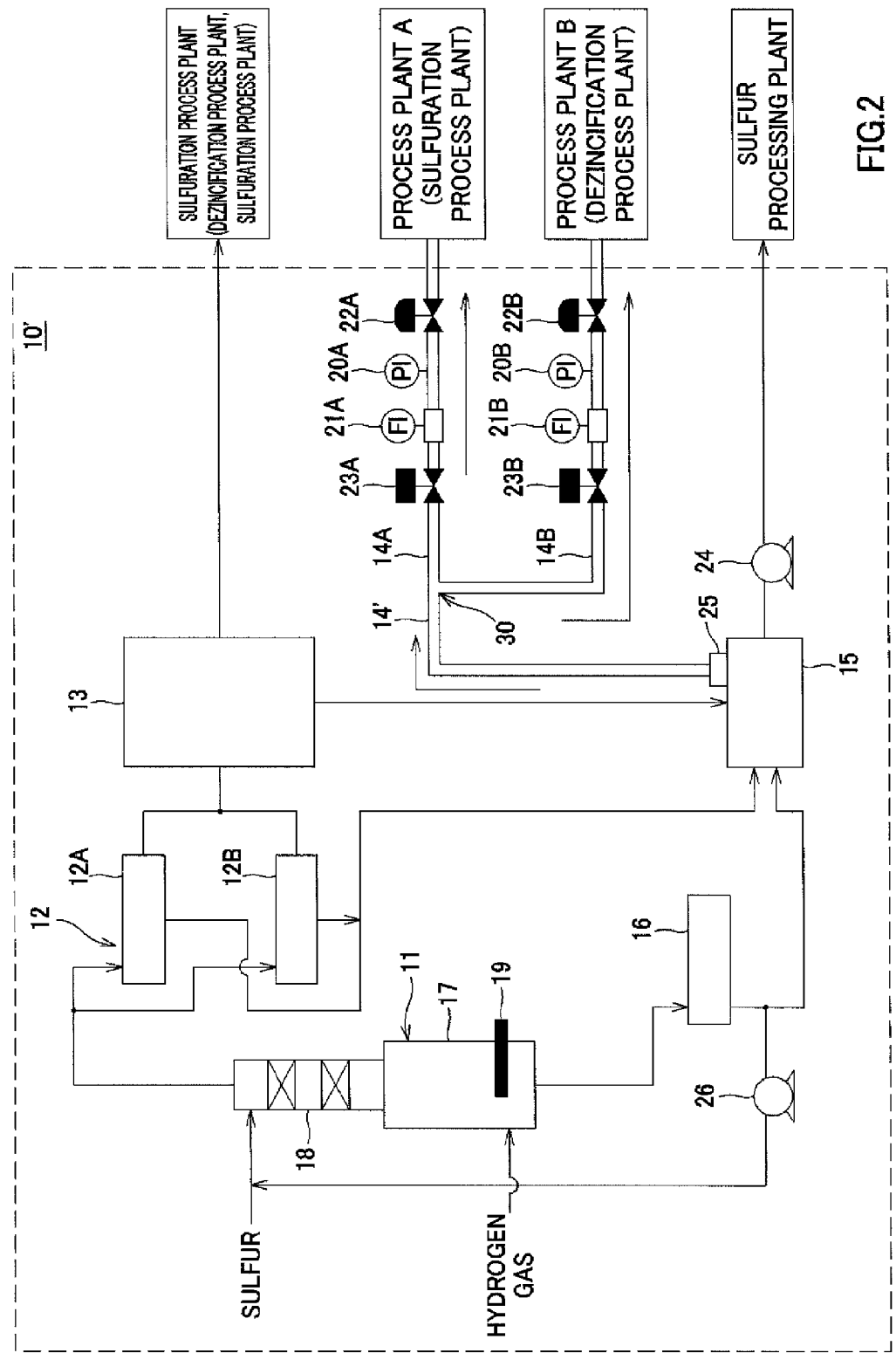
FIG. 2 is a schematic structure diagram depicting an example of a structure of a hydrogen sulfide gas production plant.

FIG. 2 is a structure diagram of a hydrogen sulfide gas production plant 10', which is configured to supply the waste hydrogen sulfide gas to two process plants where the hydrogen sulfide gas is used (process plant A and process plant B). In the hydrogen sulfide gas production plant 10' depicted in FIG. 2, the same reference symbol is used for the same structure as that of the hydrogen sulfide gas production plant 10 depicted in FIG. 1, and the description thereto is omitted.

The hydrogen sulfide gas production plant 10' includes the reaction facility 11, the cooling facility 12, the sulfur removing facility 13, the blow-down facility 15, and the sulfur cooling facility 16. The hydrogen sulfide gas production plant 10' further includes a pipe 14' which recovers the waste hydrogen sulfide gas generated in the cooling facility 12 and discharged from the hydrogen sulfide gas production plant 10' and which has one end connected to the process plant where the hydrogen sulfide gas is used.

In the hydrogen sulfide gas production plant 10', the pipe 14' is branched at a predetermined branch point 30 into two branch pipes 14A and 14B which are connectable to the two process plants where the hydrogen sulfide gas is used (process plant A and process plant B). Inside the pipes 14A and 14B, pressure gauges 20A and 20B for measuring the pressure of the supplied waste hydrogen sulfide gas and flowmeters 21A and 21B for measuring the flow rate of the waste hydrogen sulfide gas are provided respectively on the process plants A and B side relative to the branch point 30. Moreover, the pipes 14A and 14B are respectively provided with control valves 22A and 22B for controlling the supply of the waste hydrogen sulfide gas to be supplied to the process plant A and the process plant B. The pipes 14A and 14B are respectively provided with at least one ON/OFF valves 23A and 23B, which enable the isolation of the waste hydrogen sulfide gas in an emergency between the hydrogen sulfide gas production plant 10' and the plant where the hydrogen sulfide gas is used.

The pipes 14A and 14B formed by branching the pipe 14' are provided with at least the pressure gauges 20A and 20B for measuring the pressure of the waste hydrogen sulfide gas to be supplied to the process plants A and B and the control valves 22A and 22B for controlling the supply of the waste hydrogen sulfide gas. This enables the supply of the waste hydrogen sulfide gas with different pressures to the process plant A and the process plant B. In other words, the waste hydrogen sulfide gas discharged from the hydrogen sulfide gas production plant 10' can be supplied as appropriate to the plural process plants where the purpose of using the hydrogen sulfide gas or the usage condition of the gas is different.

Specifically, the process plant A and the process plant B to which the waste hydrogen sulfide gas is supplied correspond to, for example, a dezincification process plant in the dezincification process or a sulfuration process plant in the sulfuration process in the hydrometallurgy for nickel oxide ore. In the dezincification process and the sulfuration process in this hydrometallurgy, the generation of the metal sulfide is adjusted by changing the condition of the pressure of the hydrogen sulfide gas to be injected. In other words, first, zinc is made into zinc sulfide by injecting hydrogen sulfide gas with relatively low pressure to a solution obtained by leaching and the nickel oxide ore and neutralizing the mixture in the dezincification process and the zinc sulfide is recovered preferentially. Then, by injecting the hydrogen sulfide gas with relatively high pressure to the solution obtained after removing the zinc in the sulfuration process, the mix sulfide including nickel and cobalt is generated and recovered.

In this manner, the condition of the pressure of the hydrogen sulfide gas to be used is different in the dezincification process plant and the sulfuration process plant. More specifically, in the dezincification process plant, the condition of the pressure is 2 kPaG corresponding to $\frac{1}{100}$ or less of the operation pressure in the reaction facility 11 of the hydrogen sulfide gas production plant 10' and in the sulfuration process plant, the condition of the pressure is 280 kPaG corresponding to $\frac{1}{2}$ or less of the operation condition of that reaction facility 11.

As described above, since the hydrogen sulfide gas production plant 10' has the pressure gauges 20A and 20B and the control valves 22A and 22B provided respectively for the pipes 14A and 14B, the supply of the hydrogen sulfide gas can be appropriately controlled even when the condition of the pressure of the hydrogen sulfide gas to be used is largely different between the plural process plants A and B to which the waste hydrogen sulfide gas is supplied, and the gas can be effectively used in the process plants A and B. Specific description is made below of the control of the supply of the waste hydrogen sulfide gas.

As for the hydrogen sulfide gas production plant 10', the plant 10' is connected through the pipe 14' to the process plants A and B where the hydrogen sulfide gas is used, and the pipe 14' is branched into branch pipes (14A and 14B) at a predetermined branch point. This makes it possible to efficiently recover the waste hydrogen sulfide gas discharged from the plant 10' and to effectively supply the recovered waste hydrogen sulfide gas to the plural process plants A and B connected by the pipe 14'.

Moreover, since the pipes 14A and 14B formed by branching the pipe 14' are respectively provided with the pressure gauges 20A and 20B for measuring the pressure of the waste hydrogen sulfide gas and the control valves 22A and 22B for controlling the supply, the waste hydrogen sulfide gas can be efficiently supplied and the waste hydrogen sulfide gas with different pressure can be supplied to the plural process plants A and B. This makes it possible to appropriately supply the waste hydrogen sulfide gas with different pressure that satisfies the usage condition of the hydrogen sulfide gas to the process plants A and B.

3. METHOD FOR RECOVERING AND USING WASTE HYDROGEN SULFIDE GAS

Next, a method for recovering and using the waste hydrogen sulfide gas generated in the hydrogen sulfide gas production plants 10 and 10' is described.

3-1. First Embodiment

First, a method for recovering and using the waste hydrogen sulfide gas in the hydrogen sulfide gas production plant 10 is described. As described above, the hydrogen sulfide gas production plant 10 includes the pipe 14 which recovers the waste hydrogen sulfide gas discharged from the plant 10 and which has one end connected to the process plant A where the hydrogen sulfide gas is used. Then, in the method for using and recovering the waste hydrogen sulfide gas in the hydrogen sulfide gas production plant 10, the discharged waste hydrogen sulfide gas is recovered and supplied to the process plant A through the pipe 14.

As described above, the reaction facility 11 in the hydrogen sulfide gas production plant 10 is operated at a temperature as high as 470° C. and a pressure as high as 800 kPaG, and the waste hydrogen sulfide gas generated in the cooling facilities 12A and 12B have a pressure as high as 780 kPaG. On the other hand, the pressure of the hydrogen sulfide gas in the process plant A to which the recovered waste hydrogen sulfide gas is supplied is lower than the pressure of the generated waste hydrogen sulfide gas. Therefore, the provision of the pipe 14 causes the pressure difference by which the waste hydrogen sulfide gas discharged from the plant 10 can be efficiently recovered and transferred to the process plant A connected to the pipe 14.

Here, the usage condition for the hydrogen sulfide gas, such as the pressure or the flow rate, is often different depending on the process plant to which the waste hydrogen sulfide gas is supplied. Therefore, when the waste hydrogen sulfide gas is supplied to the process plant A through the pipe 14, the waste hydrogen sulfide gas is more preferably supplied appropriately while the supply is controlled as below.

Figure 3:
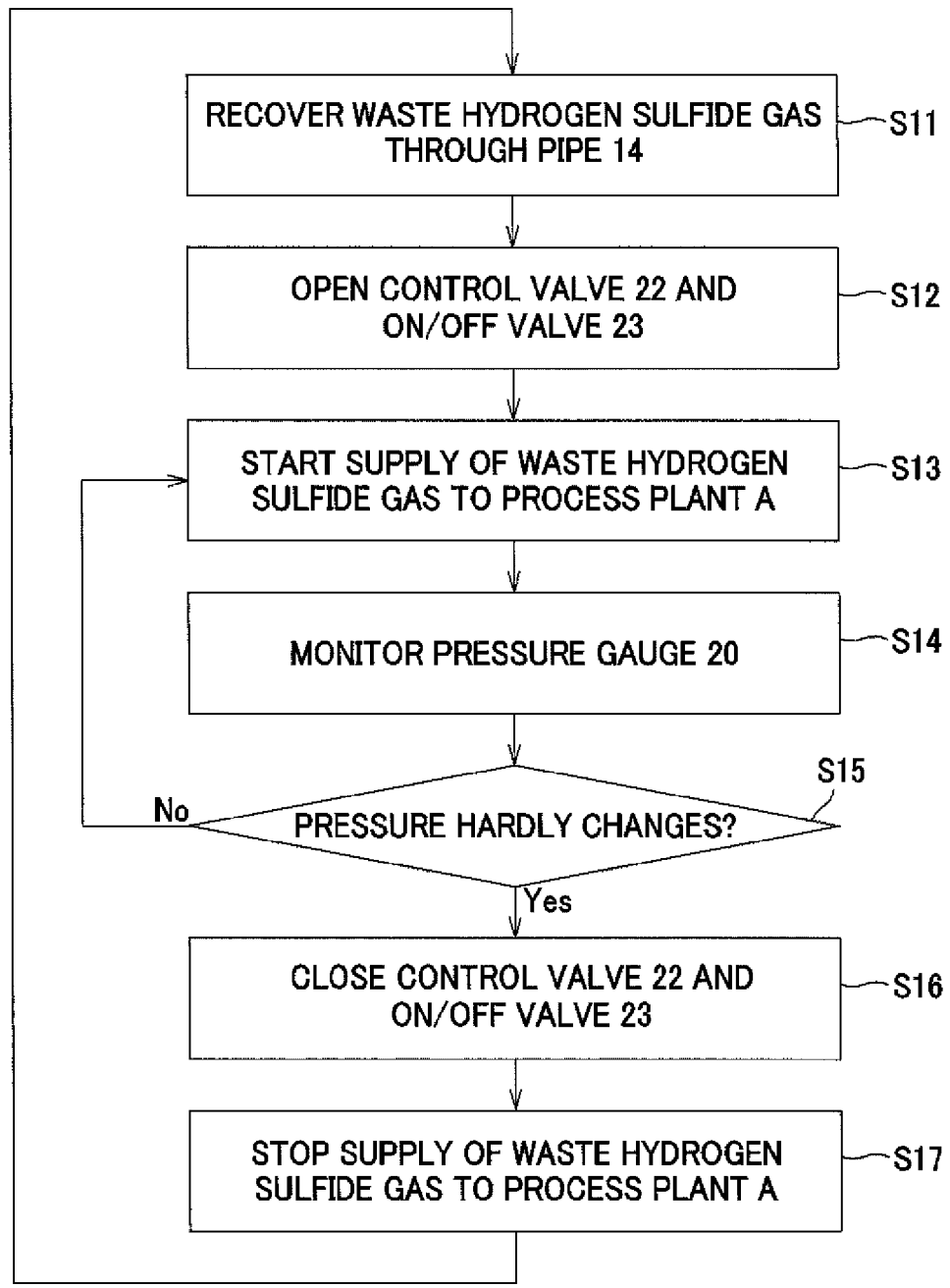
FIG. 3 is a flowchart of supply control when the waste hydrogen sulfide gas is supplied to the process plant.

Specifically, FIG. 3 is a flowchart of the supply control when the waste hydrogen sulfide gas is recovered and the recovered waste hydrogen sulfide gas is supplied to the process plant A through the pipe 14 in the hydrogen sulfide gas production plant 10.

First, the waste hydrogen sulfide gas discharged from the hydrogen sulfide gas production plant 10 is recovered through the pipe 14 in Step S11. Specifically, the waste hydrogen sulfide gas generated in the cooling facilities 12A and 12B and discharged from the outlet 25 of the blow-down facility 15 is recovered through the pipe 14.

Next, the control valve 22 provided for the pipe 14 is released in Step S12.

By opening the control valve 22 and the ON/OFF valve 23 in Step S12, the supply of the recovered waste hydrogen sulfide gas to the process plant A through the pipe 14 is then started in Step S13.

Next, the pressure gauge 20 provided in the pipe 14 is monitored in Step S14 to measure the pressure of the waste hydrogen sulfide gas flowing through the pipe 14 and supplied to the process plant A.

Then, whether the pressure measured with the pressure gauge 20 has decreased and the change in measured pressure no longer occurs substantially is determined in Step S15. In other words, whether the measured pressure has decreased to be equal to the pressure in the process plant A to which the gas is supplied so that no more waste hydrogen sulfide gas flows into the process plant A is determined. If it has been determined that the change no longer occurs substantially in Step S15 (Yes), the process advances to Step S16. On the other hand, if it has been determined that the change still occurs (No), the process returns to Step S13 and the supply of the waste hydrogen sulfide gas to the process plant A is continued.

In Step S16, the change in pressure of the supplied waste hydrogen sulfide gas no longer occurs substantially, i.e., no more waste hydrogen sulfide gas flows into the process plant A; therefore, the control valve 22 and the ON/OFF valve 23 are closed. This prevents the waste hydrogen sulfide gas from reversing into the hydrogen sulfide gas production plant 10.

By closing the control valve 22 and the ON/OFF valve 23 in Step S16, the supply of the waste hydrogen sulfide gas into the process plant A is stopped in Step S17.

In the hydrogen sulfide gas production plant 10, when the recovered waste hydrogen sulfide gas is supplied to the process plant A, the aforementioned supply control enables the more efficient supply of the waste hydrogen sulfide gas that satisfies the condition in the process plant A.

3-2. Second Embodiment

Next, description is made of a method for recovering and using the waste hydrogen sulfide gas in the hydrogen sulfide gas production plant 10'. The hydrogen sulfide gas production plant 10' has the pipe 14' which recovers the waste hydrogen sulfide gas discharged from the plant 10' and which has one end connected to the process plant where the hydrogen sulfide gas is used. The pipe 14' is branched into the pipes 14A and 14B at a predetermined point. Then, in the method for recovering and using the waste hydrogen sulfide gas in the hydrogen sulfide gas production plant 10', the discharged waste hydrogen sulfide gas is recovered through the pipe 14' and the recovered waste hydrogen sulfide gas is supplied to the process plant A and the process plant B through the pipes 14A and 14B.

It is assumed that the condition of using the hydrogen sulfide gas is different depending on the plural process plants (process plant A and process plant B) connected to the hydrogen sulfide gas production plant 10' through the pipe 14'. In this case, it is necessary to recover the waste hydrogen sulfide gas discharged from the hydrogen sulfide gas production plant 10' in a short time and to supply the recovered waste hydrogen sulfide gas efficiently and appropriately to be used effectively in the preferred mode in the process plants A and B. In the description below, the process plant A (for example, the sulfuration process plant) is the process plant where the hydrogen sulfide gas is used at relatively high pressure and the process plant B (for example, the dezincification process plant) is the process plant where the hydrogen sulfide gas is used at relatively low pressure.

Accordingly, when the waste hydrogen sulfide gas is supplied to the plural process plants in which the hydrogen sulfide gas is used at different pressure, the waste hydrogen sulfide gas is supplied first to the process plant A where the pressure is relatively high. After that, the waste hydrogen sulfide gas is supplied to the process plant B where the pressure is relatively low.

Thus, the transfer of the waste hydrogen sulfide gas to the process plants A and B can be completed in a short time and the waste hydrogen sulfide gas can be supplied effectively. In other words, by supplying the waste hydrogen sulfide gas to the process plant A first, the pressure of the waste hydrogen sulfide gas in the pipe 14' decreases over time, resulting in that the pressure can be made closer to the pressure in the process plant B. Then, by starting the supply to the process plant B after the supply to the process plant A, the waste hydrogen sulfide gas can be supplied immediately with the appropriate pressure to the process plant B; thus, it is not necessary to leave the gas for a long time until the pressure is lowered. Therefore, the gas can be effectively supplied also from the viewpoint of safety.

Note that the cooling facilities 12A and 12B in the hydrogen sulfide gas production plant 10' require the time for melting the fixed sulfur with the steam applied through the jacket, the time for recovering the molten sulfur, the time for cooling the facility after recovering the molten sulfur and transiting the state to the standby state, etc. From this viewpoint, it is desirable that the waste hydrogen sulfide gas is supplied as efficiently as possible to the process plant and to recover the waste hydrogen sulfide gas in a short time. In this point, since the supply of the waste hydrogen sulfide gas can be completed efficiently, the waste hydrogen sulfide gas can be recovered through the pipe 14' in a short time to improve the operation efficiency.

Figure 4:
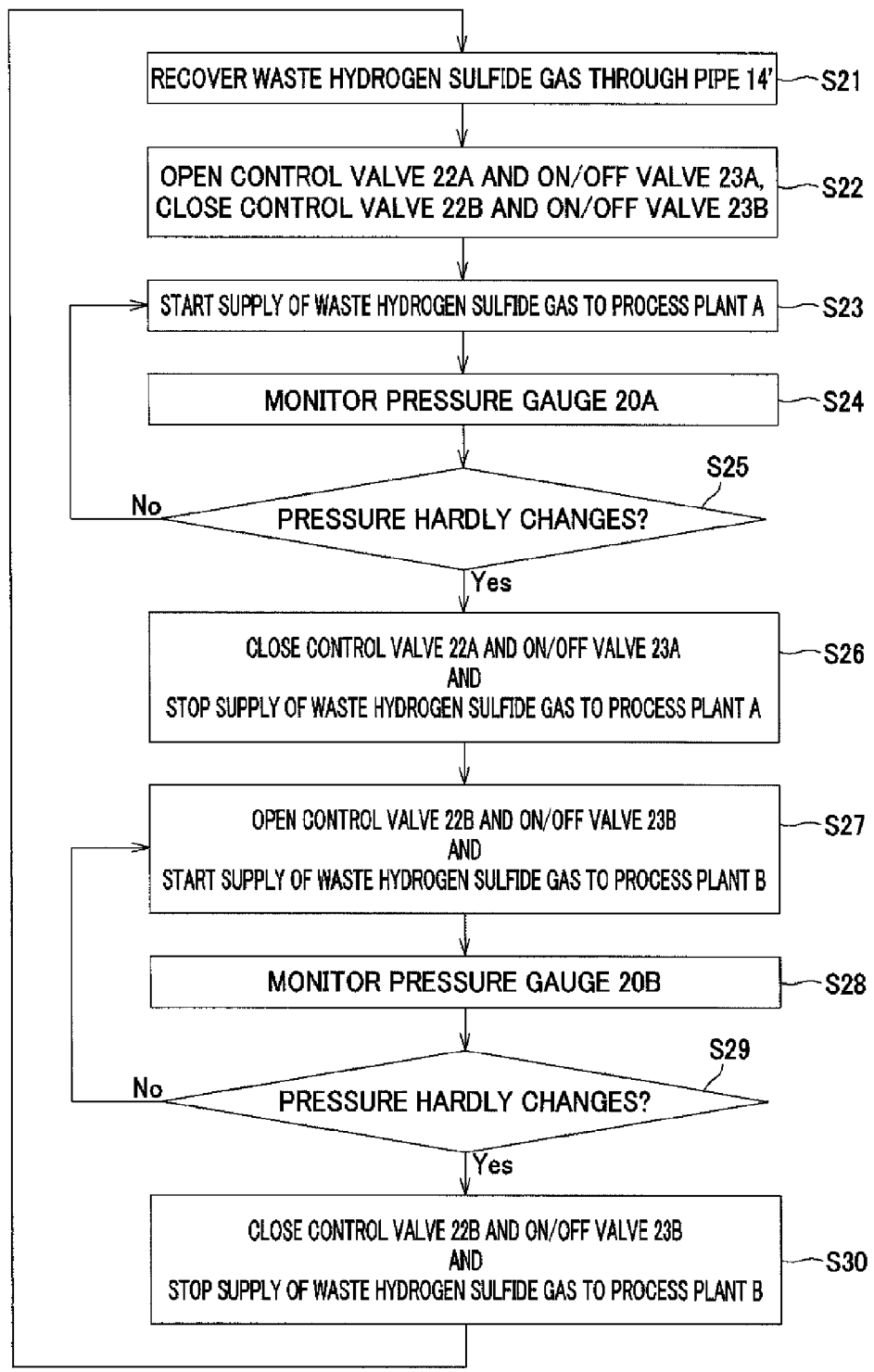
FIG. 4 is a flowchart of supply control when the waste hydrogen sulfide gas is supplied to the process plant.
Figure 5:
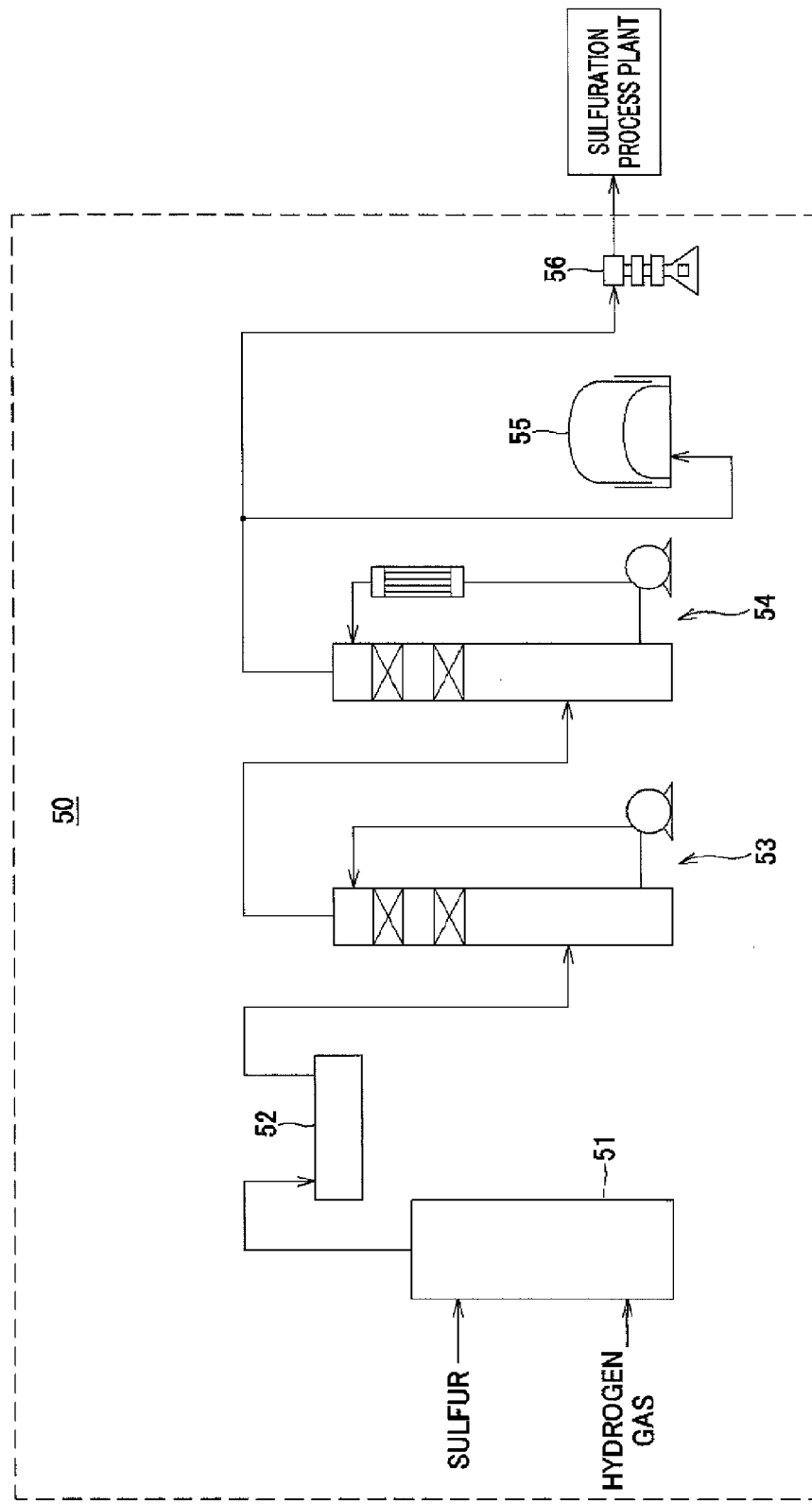
FIG. 5 is a schematic structure diagram depicting a structure of a conventional hydrogen sulfide gas production plant.

More specific description will be made with reference to the flowchart of FIG. 4 on the supply control in the case where the process plant A and the process plant B with the different pressure condition of the hydrogen sulfide gas are connected through the pipe 14' (14A and 14B) in the hydrogen sulfide gas production plant 10' and the waste hydrogen sulfide gas is supplied to the process plants A and B.

In Step S21, the waste hydrogen sulfide gas discharged from the hydrogen sulfide gas production plant 10' is recovered through the pipe 14' in Step S21. Specifically, the waste hydrogen sulfide gas generated in the cooling facilities 12A and 12B and discharged from the outlet 25 of the blow-down facility 15 is recovered through the pipe 14'.

Next, in Step S22, the control valve 22A and the ON/OFF valve 23A provided for the pipe 14A for controlling the supply of the waste hydrogen sulfide gas to the process plant A are opened and moreover the control valve 22B and the ON/OFF valve 23B provided for the pipe 14B for controlling the supply of the waste hydrogen sulfide gas to the process plant B are closed. Subsequently, in Step S23, the supply of the recovered waste hydrogen sulfide gas to the process plant A through the pipe 14A is started by the opening of the control valve 22A and the ON/OFF valve 23A in Step S22.

Next, in Step S24, the pressure gauge 20A in the pipe 14A is monitored to measure the pressure of the waste hydrogen sulfide gas flowing through the pipe 14A and supplied to the process plant A.

Then, in Step S25, whether the pressure measured with the pressure gauge 20A has decreased and the change in measured pressure no longer occurs substantially is determined. In other words, whether the measured pressure has decreased to be equal to the pressure in the process plant A to which the gas is supplied so that no more waste hydrogen sulfide gas flows into the process plant A is determined. If it has been determined that the change no longer substantially occurs substantially in Step S25 (Yes), the process advances to Step S26. On the other hand, if it has been determined that the change still occurs (No), the process returns to Step S23 and the supply of the waste hydrogen sulfide gas to the process plant A is continued.

In Step S26, the change in pressure of the supplied waste hydrogen sulfide gas no longer occurs substantially, i.e., no more waste hydrogen sulfide gas flows into the process plant A; therefore, the control valve 22A and the ON/OFF valve 23A provided for the pipe 14A are closed to stop the supply of the waste hydrogen sulfide gas to the process plant A.

Then, in Step S27, the control valve 22B and the ON/OFF valve 23B provided for the pipe 14B are opened to start the supply of the waste hydrogen sulfide gas to the process plant B through the pipe 14B.

Next, in Step S28, the pressure gauge 20B provided in the pipe 14B is monitored to measure the pressure of the waste hydrogen sulfide gas flowing through the pipe 14B and supplied to the process plant B.

Then, in Step S29, whether the pressure measured with the pressure gauge 20B has decreased and the change in measured pressure no longer occurs substantially is determined. In other words, whether the measured pressure has decreased to be equal to the pressure in the process plant B to which the gas is supplied so that no more waste hydrogen sulfide gas flows into the process plant B is determined. If it has been determined that the change no longer occurs substantially in Step S29 (Yes), the process advances to Step S30. On the other hand, if it has been determined that the change still occurs (No), the process returns to Step S27 and the supply of the waste hydrogen sulfide gas to the process plant B is continued.

In Step S30, the change in pressure of the supplied waste hydrogen sulfide gas no longer occurs substantially, i.e., no more waste hydrogen sulfide gas flows into the process plant B; therefore, the control valve 22B and the ON/OFF valve 23B provided for the pipe 14B are closed to stop the supply of the waste hydrogen sulfide gas to the process plant B.

In the hydrogen sulfide gas production plant 10', when the recovered waste hydrogen sulfide gas is supplied to the process plants A and B, the aforementioned supply control enables the efficient supply of the waste hydrogen sulfide gas that satisfies the condition in each process plant even though the hydrogen sulfide gas is used in each process plant under the different pressure condition.

The above description has been made of the supply control performed for the plural process plants with different pressure conditions. In this case, moreover, the gas with the appropriate flow rate can be supplied to the plural process plants where the hydrogen sulfide gas is used in different quantity.

Specifically, for example, as compared to the quantity of the hydrogen sulfide gas used in the sulfuration process in the hydrometallurgy for nickel oxide ore, the quantity of the gas used in the dezincification process is extremely low. Therefore, the process takes long time accordingly.

Thus, even when the hydrogen sulfide gas is used under different conditions in the process plants A and B to which the waste hydrogen sulfide gas is supplied, the waste hydrogen sulfide gas can be efficiently recovered and supplied according to the method for recovering and using the waste hydrogen sulfide gas by the hydrogen sulfide gas production plant 10'. As a specific method, the control may be made based on the flow rate of the waste hydrogen sulfide gas measured with the flowmeters 21A and 21B provided for the pipes 14A and 14B, respectively. This enables the efficient operation without causing a trouble that the process takes longer time in each process plant, and the generated waste hydrogen sulfide gas can be effectively used.

4. EXAMPLES

Examples of the present invention are hereinafter described; however, the present invention is not limited to the examples below.

EXAMPLES

Example 1

In Example 1, the normal operation for producing the hydrogen sulfide gas by using the hydrogen sulfide gas production plant 10' depicted in FIG. 2 was conducted and the waste hydrogen sulfide gas discharged from the plant 10' was recovered and the recovered waste hydrogen sulfide gas was supplied to the sulfuration process plant (process plant A) and the dezincification process plant (process plant B) in the hydrometallurgy for nickel oxide ore.

In the normal operation in the hydrogen sulfide gas production plant 10', part of sulfur included in the hydrogen sulfide gas was fixed to the bottom of the cooling facilities 12A and 12B due to the cooling of the hydrogen sulfide gas; therefore, the cooling facilities 12A and 12B were used alternately. The cooling facility stopped temporarily was subjected to the process of melting and recovering the fixed sulfur. The hydrogen sulfide gas released when the sulfur was melted was used as the waste hydrogen sulfide gas.

Specifically, in the hydrogen sulfide gas production plant 10', the pipe 14' was provided for connecting the outlet 25 of the blow-down facility 15 and the nickel sulfuration process plant and the dezincification sulfuration process plant in the hydrometallurgy plant for nickel oxide ore. The pipe 14' was branched off at a predetermined position so as to be connected to the sulfuration process plant and the dezincification sulfuration process plant.

The pipes obtained by branching the pipe 14' at the predetermined branch point were respectively provided with the pressure gauges 20A and 20B for measuring the pressure of the waste hydrogen sulfide gas and the flowmeters 21A and 21B for measuring the flow rate of the gas. Moreover, the control valves 22A and 22B for controlling the supply of the waste hydrogen sulfide gas were installed on the process plant side relative to the pressure gauges 20A and 20B and the flowmeters 21A and 21B. Moreover, the ON/OFF valves 23A and 23B for the purpose of the isolation in an emergency were installed on the pipes just after the branch point.

In the hydrogen sulfide gas production plant 10' with the above structure, the recovery and the supply of the waste hydrogen sulfide gas were performed in a manner that the waste hydrogen sulfide gas was generated in the cooling facilities 12A and 12B and was released to the blow-down facility 15, the gas discharged from the blow-down facility 15 was recovered in the pipe 14' and the recovered waste hydrogen sulfide gas was supplied to the dezincification process plant and the sulfuration process plant through the pipe 14'.

Note that the condition of the operation pressure in the reaction facility 11 of the hydrogen sulfide gas production plant 10' was, as the daily average value, 780 kPaG though the value slightly varied. On the other hand, the pressure condition in the nickel sulfuration process plant to which the hydrogen sulfide gas was supplied was 280 kPaG and the pressure condition in the dezincification sulfuration process plant was 2 kPaG.

As for the supply control of the waste hydrogen sulfide gas to each process plant, first, the control valve 22A of the pipe 14' was opened and the control valve 22B thereof was closed, whereby the waste hydrogen sulfide gas (780 kPaG) recovered from the blow-down facility 15 was supplied to the nickel sulfuration process plant. When the pressure measured with the pressure gauge 20A has become approximately 350 kPaG, the change in pressure no longer occurs substantially; therefore, the control valve 22A was closed. At the same time, the valve was switched for opening the control valve 22B to supply the waste hydrogen sulfide gas remaining in the pipe 14' to the dezincification sulfuration process plant. When the pressure measured with the pressure gauge 20B has become approximately 50 kPaG, the change in pressure no longer occurs substantially; therefore, the supply to the dezincification sulfuration process plant was ended at this time. The above operations were repeated for six months.

As a result of the above operations, the exchange between the cooling facilities 12A and 12B was performed for 1488 times in total in the operation period, and the waste hydrogen sulfide gas generated by recovering the molten sulfur in the cooling facilities 12A and 12B was recovered for 15 t in total through the pipe 14 and finally the waste hydrogen sulfide gas was effectively supplied to the nickel sulfuration process plant and the dezincification sulfuration process plant.

At the same time, by the recovery and supply of approximately 15 t of the waste hydrogens sulfide gas, approximately 14.1 t of sulfur and approximately 0.9 t of hydrogen (methanol) were saved as the operation raw material corresponding to the material used for producing 15 t of the hydrogen sulfide gas. Moreover, as the material conventionally used for processing the waste hydrogen sulfide gas, approximately 17.5 t of caustic soda for absorbing and detoxifying the hydrogen sulfide gas has become unnecessary. Moreover, the conventional process for detoxifying the waste hydrogen sulfide gas and releasing the gas into the air has become unnecessary; thus, the environment is not burdened.

Comparative Example 1

In Comparative Example 1, the operation was performed by using the conventional hydrogen sulfide gas production plant.

As a result, approximately 15 t of the waste hydrogen sulfide gas generated in the cooling facility was not recovered and the dumping process by using the detoxifying facility was necessary. Then, the process in the detoxifying facility required approximately 17.5 t of caustic soda for absorbing and detoxifying the waste hydrogen sulfide gas. As compared to Example 1, approximately 14.1 t of sulfur and approximately 0.9 t of hydrogen were additionally necessary as the operation raw material. The process of the waste hydrogen sulfide gas in the flare facility also had a possibility that the generated sulfur oxide (SOx) was released into the air.

REFERENCE SIGNS LIST

10, 10' hydrogen sulfide gas production plant
11 reaction facility
12, 12A, 12B cooling facility
13 sulfur removing facility
14, 14', 14A, 14B pipe
15 blow-down facility
16 sulfur cooling facility
17 reactor
18 quench tower
19 heater
20, 20A, 20B pressure gauge
21, 21A, 21B flowmeter
22, 22A, 22B control valve
23, 23A, 23B ON/OFF valve
24 supply pump
25 outlet
26 circulation pump
30 branch point

The invention claimed is:

1. A method for recovering and using waste hydrogen sulfide gas generated in a hydrogen sulfide gas production plant including at least
    a reaction facility that generates hydrogen sulfide gas from sulfur and hydrogen gas,
    a plurality of cooling facilities, which are used alternately, that cools the generated hydrogen sulfide gas, and
    a sulfur removing facility that removes sulfur included in the hydrogen sulfide gas and supplies the hydrogen sulfide gas from which the sulfur has been removed to a process plant where hydrogen sulfide gas is used, wherein
    the hydrogen sulfide gas production plant further includes
        a pipe that recovers the waste hydrogen sulfide gas generated in and discharged from the cooling facility that has been replaced and stopped temporarily,
    the pipe has one end connected to the process plant, and the discharged waste hydrogen sulfide gas is recovered and the recovered waste hydrogen sulfide gas is supplied to the process plant through the pipe.

2. The method for recovering and using waste hydrogen sulfide gas according to claim 1, wherein a pressure gauge for measuring pressure of the waste hydrogen sulfide gas is provided in the pipe, a control valve for controlling the supply of the waste hydrogen sulfide gas is provided in the pipe on the process plant side relative to the pressure gauge, and the waste hydrogen sulfide gas recovered by opening the control valve is supplied to the process plant and when the pressure measured with the pressure gauge has decreased to the degree that the change in pressure no longer occurs substantially, the control valve is closed to stop the supply of the waste hydrogen sulfide gas.

3. The method for recovering and using waste hydrogen sulfide gas according to claim 2, wherein the pipe is branched at a predetermined branch point into branch pipes that can be connected to a plurality of process plants where hydrogen sulfide gas is used, and the pressure gauge and the control valve are provided in each of the branch pipes.

4. The method for recovering and using waste hydrogen sulfide gas according to claim 3, wherein the plural process plants use the hydrogen sulfide gas with different pressures, the waste hydrogen sulfide gas is supplied to a first process plant with high pressure by opening a first control valve in the pipe connected to the first process plant and moreover closing a second control valve in the pipe connected to a second process plant with low pressure, and the waste hydrogen sulfide gas is supplied to the second process plant by closing the first control valve and opening the second control valve when change in pressure measured with the pressure gauge in the pipe connected to the first process plant has decreased to the degree that the change in pressure no longer occurs substantially.

5. The method for recovering and using waste hydrogen sulfide gas according to claim 1, wherein the plurality of cooling facilities includes two cooling facilities.

* * * * *